(12) United States Patent
Roy et al.

(10) Patent No.: US 7,149,776 B1
(45) Date of Patent: Dec. 12, 2006

(54) SYSTEM AND METHOD FOR REAL-TIME CO-BROWSING

(75) Inventors: Anindo Roy, Fremont, CA (US); Damodar R. Prabhu, San Mateo, CA (US); Jeffrey R. Doering, San Mateo, CA (US); Xuxia Kuang, Mountain View, CA (US); Ramu Sunkara, Los Altos, CA (US)

(73) Assignee: Oracle International Corp., Redwood Shores, CA (US)

( * ) Notice: Subject to any disclaimer, the term of this patent is extended or adjusted under 35 U.S.C. 154(b) by 858 days.

(21) Appl. No.: 10/228,247

(22) Filed: Aug. 26, 2002

Related U.S. Application Data

(60) Provisional application No. 60/316,746, filed on Aug. 31, 2001.

(51) Int. Cl.
*G06F 15/16* (2006.01)
(52) U.S. Cl. ............... 709/205; 709/223; 709/227; 709/201; 718/108; 715/854; 715/512
(58) Field of Classification Search ........ 709/203–206, 709/217, 218, 223–228, 201; 707/10; 715/513, 715/854; 370/401; 718/108
See application file for complete search history.

(56) References Cited

U.S. PATENT DOCUMENTS

| | | | | |
|---|---|---|---|---|
| 5,907,680 A * | 5/1999 | Nielsen | ............... | 709/228 |
| 6,018,768 A * | 1/2000 | Ullman et al. | ............... | 709/218 |
| 6,085,226 A * | 7/2000 | Horvitz | ............... | 709/203 |
| 6,122,657 A * | 9/2000 | Hoffman et al. | ............... | 709/201 |
| 6,144,991 A * | 11/2000 | England | ............... | 709/205 |
| 6,166,739 A * | 12/2000 | Hugh | ............... | 715/512 |
| 6,230,171 B1 * | 5/2001 | Pacifici et al. | ............... | 715/512 |
| 6,259,701 B1 * | 7/2001 | Shur et al. | ............... | 370/401 |
| 6,289,333 B1 * | 9/2001 | Jawahar et al. | ............... | 707/2 |
| 6,427,162 B1 * | 7/2002 | Mohamed | ............... | 718/108 |
| 6,513,069 B1 * | 1/2003 | Abato et al. | ............... | 709/238 |
| 6,983,307 B1 * | 1/2003 | Murnick et al. | ............... | 709/205 |
| 6,615,266 B1 * | 9/2003 | Hoffman et al. | ............... | 709/227 |
| 6,631,407 B1 * | 10/2003 | Mukaiyama et al. | ............... | 709/223 |

(Continued)

OTHER PUBLICATIONS

A design framework for collaborative browsingde Jesus Hoyas Rivera, G.; Courtiat, J.-P.; Villemur, T.; Proceedings, Tenth IEEE International Workshops on Jun. 20-22, 2001 pp.: 362-367.*

(Continued)

*Primary Examiner*—Thong Vu
*Assistant Examiner*—Susan Ford
(74) *Attorney, Agent, or Firm*—Park, Vaughan & Fleming, L.L.P.

(57) ABSTRACT

A system and method for facilitating the collaborative co-browsing of a document or web page. A collaboration server retrieves content of a page on behalf of a collaboration participant or attendee. Each attendee operates or views the content with a browser that is augmented with a collaboration applet. Tags, links, script code and other references that may cause a different page to be accessed or loaded fro the current page are transformed or replaced on the server before the page is distributed to the attendees. In particular, events and redirections that may cause the attendee browser to directly navigate to another page are transformed on the server. Pre-determined rules may be applied to prevent some attendees from viewing certain content (e.g., financial or personal data). A page may be further transformed at a client browser, to redirect a hyperlink to the collaboration server or to trap some other event.

37 Claims, 4 Drawing Sheets

U.S. PATENT DOCUMENTS

| | | | |
|---|---|---|---|
| 6,668,276 B1* | 12/2003 | Ohkado et al. | 709/217 |
| 6,687,739 B1* | 2/2004 | Anupam et al. | 709/204 |
| 6,708,172 B1* | 3/2004 | Wong et al. | 707/10 |
| 6,886,132 B1* | 4/2005 | Hall et al. | 715/513 |
| 2001/0016872 A1* | 8/2001 | Kusuda | 709/205 |
| 2002/0042813 A1* | 4/2002 | Ullman et al. | 709/203 |
| 2002/0049832 A1* | 4/2002 | Ullman et al. | 709/218 |
| 2002/0078154 A1* | 6/2002 | Djennane et al. | 709/205 |
| 2002/0099775 A1* | 7/2002 | Gupta et al. | 709/205 |
| 2002/0099777 A1* | 7/2002 | Gupta et al. | 709/206 |
| 2002/0188699 A1* | 12/2002 | Ullman et al. | 709/219 |
| 2003/0005151 A1* | 1/2003 | Ullman et al. | 709/238 |
| 2003/0041108 A1* | 2/2003 | Henrick et al. | 709/205 |
| 2003/0046346 A1* | 3/2003 | Murnick | 709/205 |
| 2003/0065719 A1* | 4/2003 | Ullman et al. | 709/203 |
| 2003/0088674 A1* | 5/2003 | Ullman et al. | 709/226 |
| 2003/0101232 A1* | 5/2003 | Ullman et al. | 709/217 |
| 2003/0154266 A1* | 8/2003 | Bobick et al. | 709/223 |
| 2003/0167300 A1* | 9/2003 | Ullman et al. | 709/203 |
| 2003/0200307 A1* | 10/2003 | Raju et al. | 709/224 |
| 2004/0030759 A1* | 2/2004 | Hidary et al. | 709/218 |
| 2004/0220791 A1* | 11/2004 | Lamkin et al. | 703/11 |
| 2004/0225716 A1* | 11/2004 | Shamir et al. | 709/204 |
| 2004/0236865 A1* | 11/2004 | Ullman et al. | 709/231 |
| 2006/0080391 A1* | 4/2006 | Murnick | 709/205 |

OTHER PUBLICATIONS

Collaborative multimedia middleware architecture and advanced Internet call centerDoo-Hyun Kim; Seung-Min Park; Ji-Yong Kim; Dong-Myung Sul; Kyung-Hee Lee; Information Networking, 2001, Proceedings. 15th International Conference on Jan. 31-Feb. 2, 2001 pp.: 246-250.*

Pocket Pavilion: a synchronous collaborative browsing application for wireless handheld computers McKinley, P.K.; Li, J.; Multimedia and Expo, 2000. ICME 2000. 2000 IEEE International Conference on vol. 2, Jul. 30-Aug. 2, 2000 pp.: 967-970 vol. 2.*

Collaborative World Wide Web browsing system through supplement of awareness Sakamoto, R,; Kunifuji, S.; Knowledge-Based Intelligent Engineering Systems and Allied Technologies, 2000, Proceedings, Fourth International Conference on vol. 1, Aug. 30-Sep. 1, 2000 pp.: 233-236 vol. 1.*

Bringing 3D to Teleradiology—John, Ridingm Sadarjoen, Blumrozen www.cs.huji.ac.il/-liad/3dTeleRadiology.pdf.*

Let's talk: extending the Web to support collaboration Fuhcs, M,; Enabling Technologies: Infrastructure for Collaborative Enterprises, 1996. Proceedings of the 5th Workshop on Jun. 19-21, 1996 pp.: 316-321.*

Enterprise computing: the Java factor Ram, P.; Abarbanel, R.; Computer vol. 30, Issue 6, Jun. 1997 pp.: 115-117.*

CoMedia-an international collaboration best practice case Murphy, M.J.; Ganz, W.; Karapidis, A.; Research Challenges, 2000, Proceedings. Academia/Industry Working Conference on Apr. 27-29, 2000. Proceedings. Academia/Industry Working Conference on Apr. 27-29, 2000 pp. : 71-78.*

Web-based customer network management Jong-Tae Park; Kyung-Chan Sohn; Jong-Wook Baek; James Won-Ki Hong; Enterprise Networking Mini-Conference, 1997. ENM-97. In conjunction with the ICC-97., First IEEE Jun. 11-12, 1997 pp.: 160-169.*

ATM customer network management using WWW and CORBA technologies Jong-Wook Baek; Tae-Joon Ha; Jong-Tae Park; Hong, J.W.; Seong-Beorn Kim; Network Operations and Management Symposium, 1998. NOMS 98., IEEE vol. 1, Feb. 15-20, 1998 pp.: 120-129 vol. 1.*

* cited by examiner

SYSTEM AND METHOD FOR REAL-TIME CO-BROWSING

RELATED APPLICATIONS

This application claims priority to U.S. Provisional Application Ser. No. 60/316,746, filed on Aug. 31, 2001, which is hereby incorporated by reference.

BACKGROUND

This invention relates generally to the field of computer systems. More particularly, a system and method are provided for facilitating collaborative co-browsing of an electronic page.

Data rates experienced by users of the Internet and other networks continue to increase. With the higher data rates comes the ability to share more information faster, and a concomitant increase in the number of users desiring access to shared information. Virtually every computer or computing device is networked or otherwise in communication with one or more other computers—via the Internet, intranets, direct links, etc.

Not only do users desire access to shared information, they often desire such access to be simultaneous or nearly simultaneous. Thus, collaboration between users of interconnected computing devices is of growing interest. Efficient use of online collaboration allows businesses and users to reduce costs, increase productivity, contact new customers, etc. For example, on-line collaboration allows sales and support personnel of an organization to interact amongst themselves and with customers to achieve common goals.

However, in an on-line meeting or other collaboration (e.g., document sharing), participants need to be synchronized very quickly. Any perceived latency in achieving synchronization may degrade the experience. It is thus a challenge to ensure such synchronization using available computing devices and communication networks.

Existing solutions to the need for real-time on-line collaboration have noticeable shortcomings. Many solutions do not scale well beyond a few users; others cannot operate within the context of the users' preferred application; yet others require significant alteration of a user's normal method or mode of operation.

Regarding scalability, one attempted solution to the need for a real-time on-line collaboration system employs URL (Uniform Resource Locator) pushing. In URL pushing, a URL accessed by one user is pushed to one or more other, collaborating, users. However, URL pushing often does not propagate the entire state of the meeting or collaboration. It merely promotes the sharing of a particular URL, which does not ensure that all users receive the same content or have the same experience.

Another proposed solution may attempt to perform most or all necessary processing or computation on one site (e.g., a server). Such processing may include extensive modifications to a web page (e.g., to every link or reference in the page) before the page can be shared. This requires every user to wait for that processing to complete, regardless of the amount of time it takes.

Yet another attempted solution involves application sharing, a mode of operation that consumes a large amount of bandwidth by inefficiently recreating or duplicating, on all users' systems, changes made on one system. For example, the content or information displayed to one user may be painstakingly copied (e.g., pixel by pixel, object by object) and broadcast to all other users. In addition to the inefficient communication strategy, there may be no ability to filter the content being copied from one user to another, to block sensitive or confidential information, for example.

Other solutions require specialized utilities or applications and do not allow collaborating users to employ their normal or preferred applications (e.g., a web browser, a word processor, particular sales or accounting software). Some solutions require users to visit a third party site in order to setup a collaborative session. Existing solutions may also require repeated client or user approval—to download a utility or application or take other action necessary for collaboration. This can become distracting or even disruptive, and further detract from the effectiveness of the collaboration.

Many proposed real-time collaboration systems also do not provide for real-time annotation of a collaboration, or attempt to provide such annotation in an inefficient manner. For example, if a number of users collaborate on a document (e.g., to browse or edit it), when one user annotates or marks the document, it is desirable to have those annotations displayed to all users. The one user may highlight a portion of the document, employ a presentation pointer to call attention to a portion of the document, scroll the document, etc. To have a truly collaborative session, all users should receive those annotations in real-time.

Therefore, what is needed is an effective system and method for facilitating real-time on-line collaboration, wherein the amount of information communicated within the system is kept relatively low. What is also needed is a real-time on-line collaboration system and method in which annotations made during the collaboration are duplicated for all users.

SUMMARY

In one embodiment of the invention, a system and methods are provided for facilitating the collaborative co-browsing of a document or web page. In this embodiment, collaborators operate client browsers that are augmented, for purposes of the collaboration, with a collaboration applet. The applets are configured to communicate with a collaboration server to relay information about co-browsing events and pages to be co-browsed.

In one embodiment of the invention, a collaboration server retrieves a page on behalf of a collaboration attendee (e.g., the host). Tags, links, and/or other script code or markup language within the page that may cause another page or object to be accessed or loaded are transformed or replaced on the server before the page is distributed to the attendees. In particular, events, functions and redirections that cannot be trapped at the attendees' browsers are transformed on the server. Also, pre-determined rules may be applied to prevent some attendees from viewing certain content (e.g., financial or personal data). A page may be further transformed at a client browser, to redirect a hyperlink to the collaboration server or to trap some other event, to record co-browsing information (e.g., the page's original URL, a client identifier), and so on.

In another embodiment of the invention, the collaboration server retrieves a document (e.g., web page) on behalf of a collaboration attendee (e.g., the host) and distributes it to all attendees for co-browsing. An attendee then annotates, edits or manipulates the document through highlighting, editing, using a pointer, scrolling, etc. For example, the attendee may modify one or more field values in a form. When the attendee makes annotations, they are communicated back to the collaboration server as events, and are distributed to other attendees. Illustratively, the location or area of an annotation or mark may be reported in a normalized fashion (e.g., horizontal and vertical ratios within the document), which can be translated or resized as needed for different attendees (e.g., because of different font types or sizes, window sizes, screen resolutions).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Real-Time On-Line Collaboration

In one embodiment of the invention, a system and method are provided for facilitating real-time on-line collaboration among a plurality of attendees. In different implementations of this embodiment, the attendees may collaborate to draft or revise a document, view or modify a document, chat, conduct a poll, or cooperate in some other way. A document accessed in a real-time on-line collaboration may be a web page, a document prepared by an application program (e.g., a word processing document, a spreadsheet, a presentation) or some other electronic document.

Figure 1:
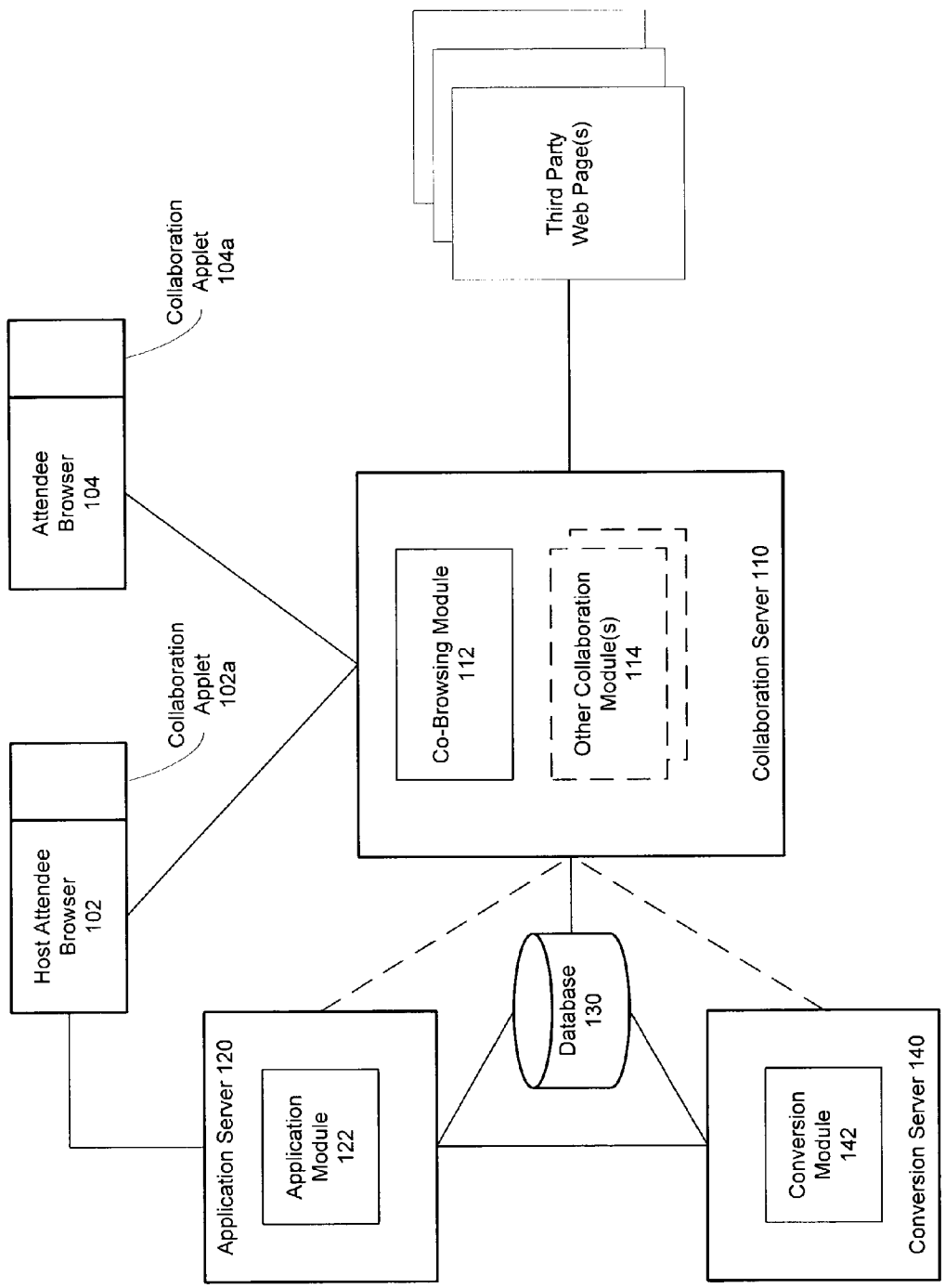
FIG. 1 depicts a real-time on-line collaboration system, according to one embodiment of the present invention.

FIG. 1 illustrates a real-time on-line collaboration environment according to an embodiment of the invention. In this environment, the collaboration includes attendees 102 and 104, one of which (e.g., attendee 102) is a host. Any attendee may serve as host to control or manage the collaboration, and host designation may be able to be passed from one attendee to another.

Each attendee operates or views a client device comprising a browser. The browser is augmented with a collaboration applet (e.g., applets 102a, 104a) to facilitate the collaboration. Illustratively, a browser's collaboration applet may be downloaded when an attendee creates or joins a collaboration session, and may be removed upon termination of the collaboration. Collaboration applets may be written in Java or another suitable programming language compatible with the attendee's browser. In one implementation of the embodiment of FIG. 1, LiveConnect technology or similar technology may be used to interface between the Java of the collaboration applet and the JavaScript (or other script code) of a browsed page or document.

In an embodiment of the invention, a collaboration applet may establish communication between a client browser and a collaboration server using sockets, HTTP tunneling or some other method or technology. The applet relays client browsing events to the server and receives and applies events and state changes to a co-browsed web page or document. The applet may also deliver collaboration session information and control options between the server and a client.

A user interface of the collaboration applet enables an attendee (e.g., the host) to select or change a current URL, access a list of attendees and their statuses, request or relinquish control of the collaboration session, open another collaboration session, open another channel of communication between attendees (e.g., to chat via text or voice, to take a poll), etc.

In addition to attendees 102 and 104, the environment of FIG. 1 includes collaboration server 110, application server 120, database 130, conversion server 140 and one or more third party web pages or sites. In this embodiment, any or all of the components or functions of servers 110, 120, 140 and database 130 may be co-located (e.g., on one physical computer system) or combined in any suitable fashion. For example, application server 120 may comprise or be co-located with conversion server 140. Or, collaboration server 110 may comprise application server 120 and conversion server 140.

In the illustrated embodiment of the invention, collaboration server 110 includes co-browsing module 112, which is configured to facilitate co-browsing of a web page, web site or document by the attendees. Collaboration server 110 may also include one or more other collaboration modules 114 to facilitate other forms of collaboration (e.g., chat, polling).

Application server 120, database 130 and conversion server 140 are interconnected, and any or all of these may be coupled to collaboration server 110. Application server 120 includes application module 122, which may be configured to facilitate the sharing, among the attendees, of an application, document or other item generated by the application.

Database 130 comprises a suitable database for storing details of a collaboration session, as well as documents, files and other objects to be shared among collaboration attendees. In one embodiment of the invention, database 130 is Oracle Server by Oracle Corporation.

Conversion server 140 includes conversion module 142, which may be configured to convert a document or file from one format (e.g., a Microsoft Office application) to another (e.g., HTML (Hypertext Markup Language)). In particular, conversion server 140 and conversion module 142 may provide conversion services to transform a document or file provided by a host attendee into a web page or other browsable format for co-browsing by all attendees.

The third party web page(s) may include virtually any page or browsable content accessible to an attendee or the collaboration server. The page(s) may include textual, graphical and/or other objects.

Elements of the real-time on-line collaboration environment of FIG. 1 may be coupled via shared (e.g., network) and/or point-to-point links, which may be wired or wireless. In one implementation of this embodiment of the invention, two or more elements are coupled via the Internet or other publicly accessible network.

In an on-line collaboration system provided by an embodiment of the invention, HTML documents and/or other browsable pages are fetched by a collaboration server from their respective web servers, or other sources, and served to each client participating in the collaboration (e.g., via their collaboration applets). A request from a particular client for a particular page, instead of being directed to the page's original server/source, is directed to the collaboration server. The server fetches the page and serves it to all clients. This may require "instrumentation" of the page content before it is served to clients to ensure that subsequent requests from within the page are directed to the server. Methods of performing instrumentation are described below.

Thus, in one method of employing the system of FIG. 1 to perform collaborative co-browsing between attendees, host attendee 102 selects or specifies a third party web page to be viewed. The host's browser (e.g., collaboration applet 102a) ensures that the selection or request is transmitted to collaboration server 110 instead of being directed to the third party web page.

Collaboration server 110 receives the page request and retrieves the indicated page. The page is transformed as necessary, and pushed or otherwise provided to attendees 102, 104 to be co-browsed via the attendees' browsers.

Any request to access or retrieve another page or page object (e.g., an image, a JavaScript file) while the first page is co-browsed is directed to collaboration server 110. In particular, javascripts (or other scripts) inserted into the first page trap such requests and redirect them if they have not already been redirected or modified. Further, as host attendee 102 (i.e., the "controller" of the co-browsing experience) manipulates a viewed page, to highlight a section, scroll, and so on, those manipulations are transmitted to the collaboration server and forwarded to the other attendees.

Figure 2:
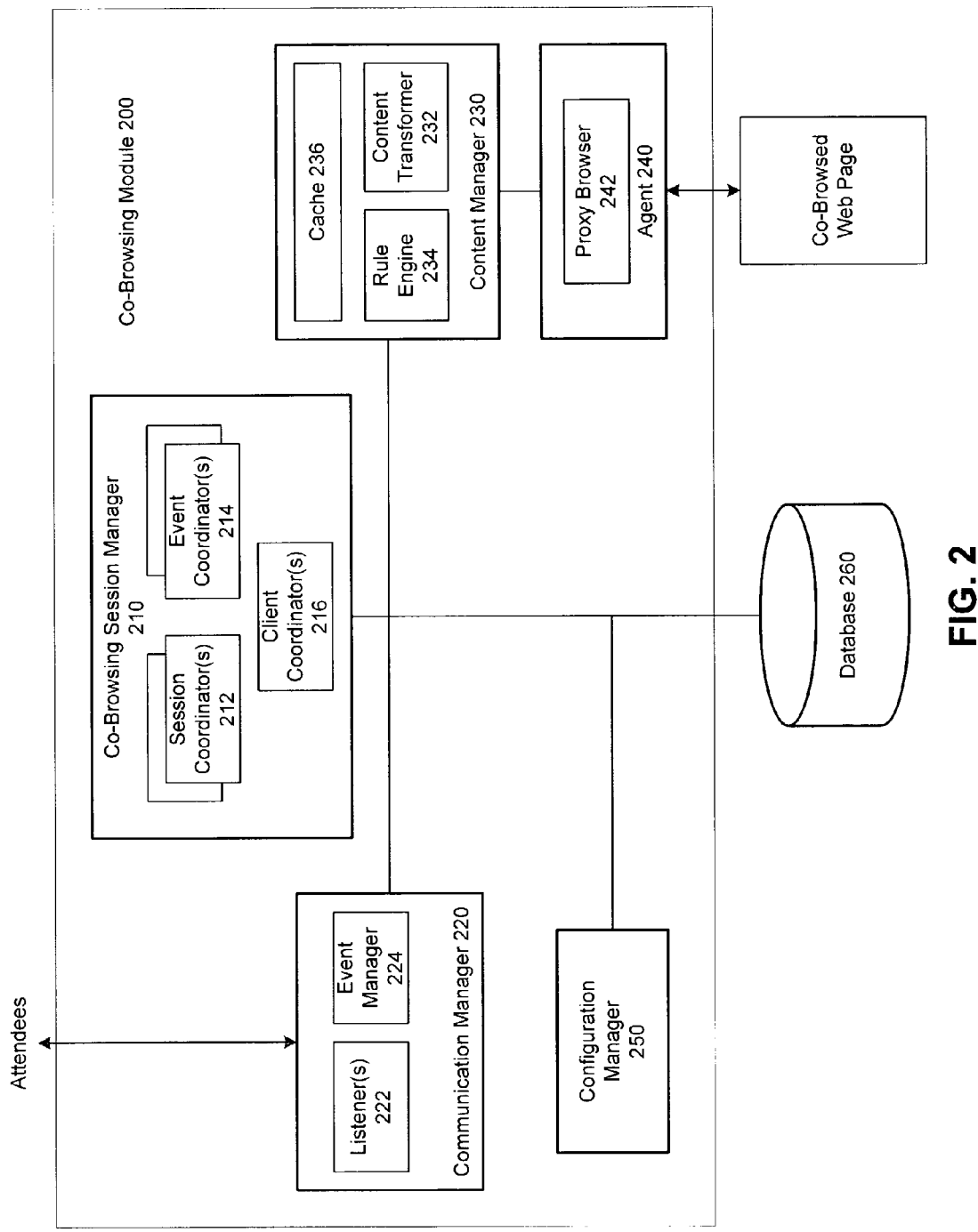
FIG. 2 depicts a co-browsing module of a collaboration server, according to one embodiment of the invention.

FIG. 2 is a block diagram depicting a collaboration module (e.g., co-browsing module 112 of FIG. 1) according to one embodiment of the invention. Co-browsing module 200 of FIG. 2 resides on a collaboration server, and includes session manager 210, communication manager 220, content manager 230, agent 240 and configuration manager 250. Database 260 may be co-located with co-browsing module 200, or may be located elsewhere.

Session manager 210 processes incoming client events (received through communication manager 220), maintains collaboration and client states, and issues events (e.g., to notify clients of state changes). The session manager can manage multiple concurrent collaboration sessions.

In one embodiment of the invention, the session manager includes one or more session coordinators 212 (e.g., one for each active co-browsing session) to notify clients of session state changes (e.g., when a host clicks on a link or scrolls a page). Session manager 210 may also include one or more event coordinators 214 to receive incoming events and to queue and schedule co-browsing events. Further, the session manager may include one or more client coordinators 216 to track client states, authenticate clients, verify client permissions or roles, etc.

Communication manager 220 handles communications with clients (e.g., client devices of collaboration attendees). In particular, the communication manager communicates with collaboration applets downloaded to each client browser during, or in preparation for, a co-browsing session. The collaboration applet updates state changes to a client's version of a co-browsed web page, provides session information and control options to a client, and relays client browsing events to co-browsing module 200.

In the illustrated embodiment, communication manager 220 includes one or more listeners 222, and event manager 224. The different types of listeners that may be used include a socket listener and an HTTP listener. The event manager generates internal events (internal to co-browsing module 200) in response to client communications, to shield other components of the co-browsing module from extraneous details of client communications. Client events are passed to session manager 210 for action. The communication manager also transmits outgoing events, to clients, on behalf of the session manager. Communication manager 220 may also include one or more caches or queues (e.g., for different co-browsing sessions, for different clients), and may include an authorization manager to authenticate or validate clients and client communications.

Content manager 230 obtains content upon request of a host attendee. In this embodiment, content manager 230 obtains content via agent 240 (e.g., an HTTP agent) and proxy browser 242. Content may be cached in cache 236, and is provided to session manager 210 to be distributed to attendees. Co-browsed content may include text, images, script or programming code (e.g., JavaScript), and any other supported MIME type.

In the embodiment of FIG. 2, content transformer 232 modifies or transforms content (as described in a following section) to prepare it for dissemination to co-browsers. Illustratively, such transformations may promote the shared filling of a form, redirect hyperlinks to the collaboration server, enable propagation of browsing events (e.g., highlighting, scrolling), etc. Content cache 236 stores original content retrieved from a third party web site and/or transformed content. More particularly, client-independent transformations to facilitate co-browsing for all types of clients may be applied before content is cached. Client-dependent transformations may be applied to content retrieved from the cache, before it is sent to an attendee. A separate content cache may be established for each co-browsing session handled by co-browsing module 200, or one cache may be shared between different collaboration sessions.

Rule engine 234 of the content manager applies business rules or logic to content of a page to be co-browsed. For example, an organization or individual may specify that certain elements of a form (e.g., social security number, salary, credit card number) are to be limited to one (e.g., the host) or more specified attendees. Further, certain events, functions or actions (e.g., to purchase equipment, enter into a binding legal agreement) may be disabled for all attendees or may be enabled for only specified attendees (e.g., the host). Attendee roles may be used to apply the business rules (e.g., to identify those attendees for whom a rule does or does not apply).

In general, business policy rules may be applied to the content of a page to control how the content appears to an attendee, or what the attendee is able to see or do with each co-browsable page that is displayed.

Configuration manager 250 enables customization of the co-browsing module (e.g., for cooperation with a third party application). Through the configuration manager, the database may be accessed, user profiles may be managed, system performance can be monitored, security constraints may be applied (e.g., by assigning user roles or access permissions), etc. A reports interface may be provided (e.g., as part of configuration manager 250 or another component of co-browsing module 200) to record and/or report information regarding a collaboration session.

Modifying a Page to Facilitate Collaborative Co-Browsing

In an embodiment of the invention, a collaboration server is configured to transparently retrieve web pages and components of web pages (e.g., images, style sheets, scripts) on behalf of collaboration attendees, and then feed the pages and components to the attendees. This helps ensure that attendees receive the same information and have substantially the same browsing experience.

However, to ensure that an attempt by an attendee's browser (e.g., the host's browser) to retrieve a web page or component is routed to the collaboration server, each page provided to that attendee is examined and processed accordingly. In particular, each link, reference, function, property, style sheet or other element of the page that may initiate contact with another system is modified or replaced to connect to or call the collaboration server instead of a third party server. The collaboration server then executes the original link or reference to retrieve a page or page component.

As one skilled in the art will appreciate, there are numerous ways to reference another web page or component of a web page. For example, references may be made in the native language of the page, such as HTML, or in a script language (e.g., JavaScript) that augments the page.

In one embodiment of the invention, when the collaboration server receives or retrieves a page for collaboration purposes, it may convert or transform a first set of references to page components or other pages. When the page is forwarded to the attendees, one or more javascripts inserted into the page may then convert or transform other references, as needed. Other (i.e., non-host) attendees' javascripts may act similarly, especially if the collaboration allows an attendee other than the host to select links, request pages, make annotations, etc.

More particularly, the collaboration server may be configured to modify links within a page that will or would occur automatically within a client browser. Such links cannot be trapped or modified at the client browser at run time. Other links, such as hyperlinks that must be specifically selected by an attendee in order to be executed, are left for the browser (or javascripts) to modify. Thus, in this embodiment of the invention, the system efficiently divides transformation tasks between the collaboration server and the attendees.

Further, the link modifications done by a client browser are performed "just in time," in that they are not done unless and/or until necessary. More specifically, a web page may contain many links that are only executed when a user selects one or takes some other specific action. Instead of transforming all of them ahead of time, to point to the collaboration server, only a link that is actually selected or invoked is transformed. This helps reduce the necessary processing by the server.

Illustratively, when the collaboration server modifies a URI/URL (Uniform Resource Identifier/Uniform Resource Locator) or other reference within a page, it saves the original reference (e.g., a reference to a page, an image, a script file), and replaces it with a URL or other reference to the collaboration server. This replacement reference may include the original reference or an identifier that the collaboration server can use to match it to the original reference.

Similarly, when a client browser or collaboration applet transforms a link, it replaces the original reference with one that points to the collaboration server. The replacement reference may include or identify the original reference. As one alternative, the collaboration server and attendee browsers may cooperate to identify, in a predetermined manner, the links that the browsers may modify. Then, when a browser modifies a link that was executed or invoked, it replaces it with a reference to the collaboration server and an identifier that allows the server (when it receives that reference) to determine which original link was invoked.

In one embodiment of the invention, a limited number of general categories of tags or references (e.g., HTML tags) are modified by the collaboration server before serving a requested page to the attendees: 1) refresh attributes within META tags; 2) source (SRC) attributes within IMG (image) and FRAME tags; 3) source attributes within SCRIPT tags; 4) other script code contained within SCRIPT tags and/or other tags.

META tags: A META refresh tag tells a browser to automatically request another page (identified in the tag) after a certain number of seconds. This is often called "redirecting" because a user is being sent to a page other than the one he or she requested. And, because this redirection occurs automatically, there is no chance for a javascript inserted into the page to intercept it. Therefore, the collaboration server transforms these types of references to point to the collaboration server.

FRAME tags: A FRAME tag defines a single frame in a frameset. The SRC attribute of a FRAME tag takes as its value the URI/URL of a document or page to be displayed in the frame. Because frames are used in place of the body of an HTML page, a FRAME tag is automatically applied, and the specified URL automatically retrieved, when the page is loaded. Therefore, the collaboration server modifies the URI or URL to point to the collaboration server.

IMG tags: An IMG tag identifies or defines an image. The SRC attribute of an IMG tag takes as its value the URI or URL of an image to be automatically displayed when the page is loaded. The collaboration server should therefore modify the URI/URL to point to the server.

SCRIPT tags: Scripts allow greater interactivity in web pages by enabling them to respond to user events. For example, a script could be used to check a user's form input prior to submission, and provide immediate notice of any errors. The SRC attribute identifies the location of an external script, which is automatically retrieved and executed. The suffix of the location may identify the script language (e.g., *.js for JavaScript). In this embodiment of the invention, the collaboration server modifies the location to point to the collaboration server. Then, if the external script is needed, the collaboration server can transform any necessary references within the script before serving it to the attendees.

Other script code: Besides referencing external scripts, as described immediately above, a page may also include explicit script code (e.g., JavaScript) executed in response to an event. For example, "onLoad" events are executed when a page is loaded, "onClick" events are executed when a particular object is clicked on, "onMouseOver" events are executed when a mouse cursor is placed above a particular object, and so on. Some of these events, and some script functions, may need to be modified on the server before a page is served to the attendees.

In an embodiment of the invention, instead of conducting a relatively time-consuming process of parsing javascripts, frames or other markup language to find all code that should be modified, specific pieces of code may be searched for and modified.

Illustrative pieces of JavaScript code (e.g., properties, objects, methods) that may involve or cause the loading of a page or page component, and which therefore may be searched for, include:
 (i) document.location.href="http:// . . . ";
 (ii) window.location="http:// . . . ";
 (iii) location="http:// . . . ";
 (iv) window.replace("http:// . . . ");
 (v) window.navigate("http:// . . . ");

As one skilled in the art will recognize, there are various other code snippets that may also enable the retrieval of a page or page component, and which therefore may also be searched for.

In an embodiment of the invention, some or all such pieces of script code may be modified, transformed or replaced, by the collaboration server and/or a client browser, to ensure that requests for documents, pages, scripts, page components, and anything else that might allow a page to escape the boundaries of a collaboration, are redirected to the collaboration server.

For example, the word "location" in examples (i) and (iii) above (and/or other script statements) may be replaced with a suitable placeholder to prevent the code from operating normally. Thus, an occurrence of
 document.location.href="http://www.yahoo.com";

may be changed to
 document.xxlocxx.href="http://www.yahoo.com";

or some other suitable sequence of characters in place of "location."

In addition, script code may be added to monitor this property and, if invoked, a corresponding HTTP (Hypertext Transport Protocol) request would be issued to the collaboration server. The request may identify the target of the original property.

Further, the collaboration server or client browser may insert a substitute for a particular function or method, such as the replace or navigate methods of examples (iv) and (v) above. Thus, "window.replace," "window.navigate" and "document.Write" methods could be redefined with the following:
 window.replace=xxxReplace;
 window.navigate=xxxNavigate;
 document.write=xxxDocWrite;

Prior to applying such redefinitions, the old functions could be saved as follows:
 window.oldReplace=window.replace;
 window.oldNavigate=window.navigate;
 document.oldWrite=document.write;

Then, whenever the "replace," "navigate" or "write" method is invoked, the substitute method is called in its place, which will be configured to perform any necessary URL/URI modifications.

In one embodiment of the invention, the collaboration server need not know or examine the context of a particular reference before transforming or replacing it. For example, the server may simply search for specific patterns, functions or references and replace or transform them as described above.

An embodiment of the invention may be applied to share a user document other than a web page among attendees. Illustratively, the document may be uploaded (e.g., to an application server) and converted into a browsable web page or HTML document. The converted document is then shared as a third party web page would be shared.

In an embodiment of the invention, before the collaboration server distributes a co-browsed page or document it may apply a set of rules (e.g., business rules, browsing rules) to limit disclosure of certain information. For example, the collaboration server or a co-browsing module may be configured to prevent some content (e.g., personal or financial data, proprietary or classified information) from being displayed to any attendees, or just certain attendees. The content that an attendee may be permitted to see, or restricted from seeing, may be determined by the attendee's access permissions, assigned role(s) or other characteristics. Thus, content from a co-browsed page may be filtered and, in addition, data entered by a (host) attendee (e.g., data within a form) may also be filtered.

Figure 3:
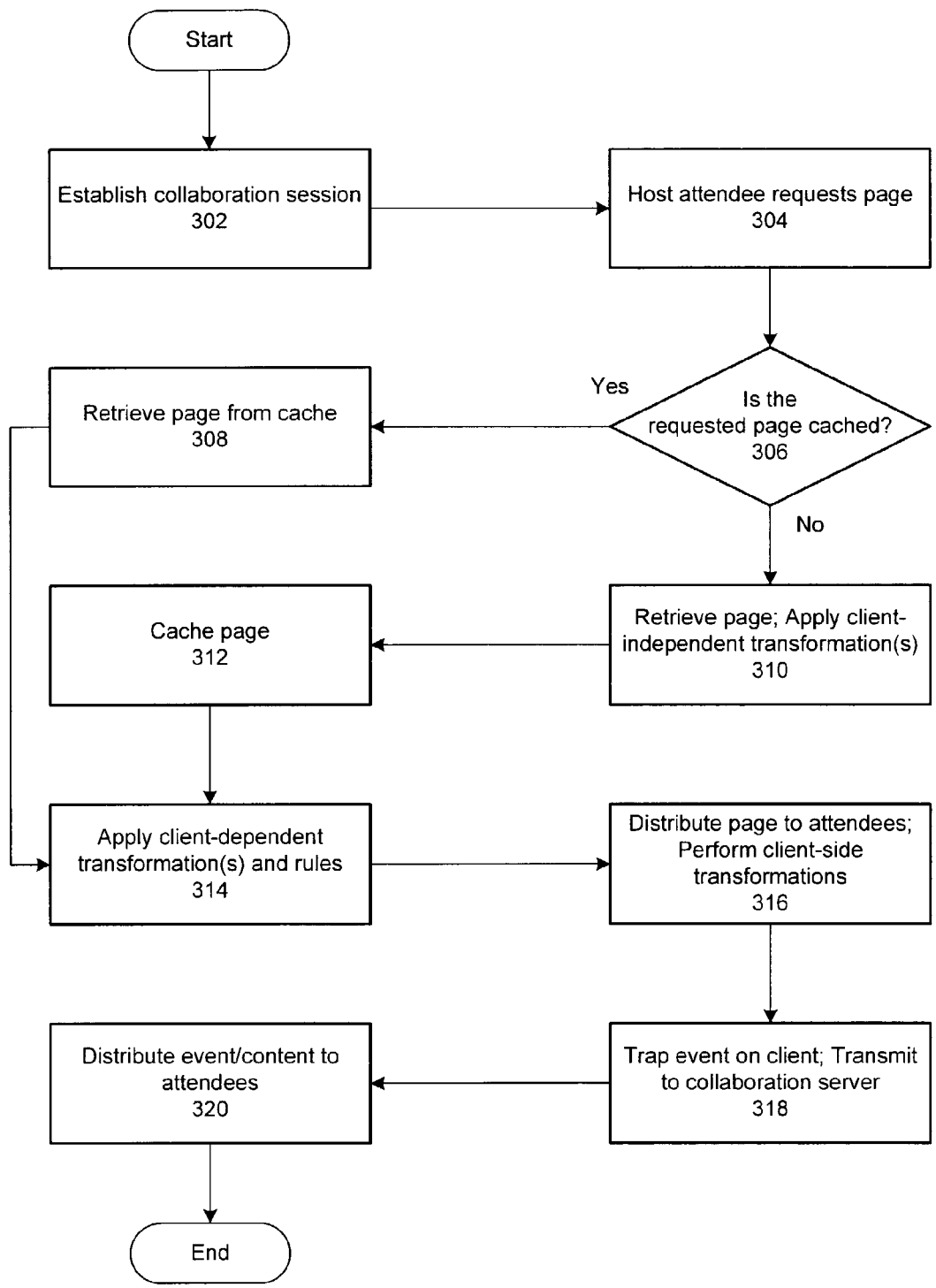
FIG. 3 is a flowchart illustrating one method of facilitating the co-browsing of a page, according to one embodiment of the invention.

FIG. 3 demonstrates one method of transforming or modifying a page or document to facilitate its co-browsing, according to one embodiment of the invention.

In state 302, a collaboration session is established for two or more attendees, one of which acts as a host for the session. Illustratively, a first attendee (e.g., the host) may establish the session after connecting to a collaboration server, and then invite the other attendee(s) to join. Alternatively, two or more of the attendees may connect to the collaboration server and a session comprising the connected attendees may then be established.

The session may be created for a limited purpose (e.g., co-browsing), or may allow multiple forms or channels of communication between the attendees (e.g., co-browsing, chat, polling, multimedia sharing). As part of the session creation, or when each attendee joins the session, a collaboration applet is downloaded to the attendee's browser.

In state 304, the host attendee requests a first page or document (e.g., a web page, a document generated via an application). The request is transmitted from the attendee's browser (e.g., the collaboration applet) to the collaboration server (e.g., a co-browsing module handling the collaboration session). In this embodiment of the invention, only the host attendee can request a page or page component, but the host designation may be passed among some or all attendees.

In state 306 the collaboration server determines whether the requested page is currently cached. If not cached, the method advances to state 310.

Otherwise, in state 308, the requested page is retrieved from a cache. Multiple caches may be maintained, such as one for each collaboration session, or multiple sessions or session channels may share a cache. After state 308, the illustrated method proceeds to state 314.

In state 310, the requested page is retrieved from a web site, a document repository or other location, and may be converted if necessary (e.g., to convert it into a browsable format, such as HTML). One or more images, style sheets, multimedia files, script files and/or other objects or components identified or referenced in the page may also be retrieved.

Then, client-independent transformations may be applied, to modify any tags, style sheet references, script code or other references within the page that are executable by any attendee's client device, but which cannot be trapped or intercepted at the client's browser. In one embodiment of the invention, client-independent transformations may include the addition of script (e.g., JavaScript) code to the page and/or the modification of content through pattern searches and replacements (e.g., as described earlier in this section). Thus, page refreshes and page changes triggered by content within the page that cannot be controlled by the addition of script code alone may be handled by finding and replacing/modifying such events before serving the page to the client browsers.

One type of client-independent transformation involves the redirection of hyperlinks from original targets to the collaboration server (or collaboration module). Although this redirection may be performed on the server, in one embodiment of the invention some or all hyperlinks are redirected on the client side, through the addition of JavaScript or other suitable code. Illustratively, such code is added to the page to capture link clicks and redirect them to the collaboration server.

When script code is added to a requested page, code for capturing mouse clicks and for defining event handler functions may be placed above the page content. Other code, for assigning event handlers, manipulating objects, and so on, may be placed below the content and outside any onLoad event handler. Also, some script variables may be added to the page to store the original URL of the page, a page ID (maintained by the session's collaboration module), the URL of the collaboration server, pointer and highlighting images for use during co-browsing, etc.

Other client-independent transformations may include, as described above, modifications to script functions and statements (e.g., replacing .location.href with .xxlocxx.href), modifications to HTTP requests within framesets, modifications to refresh events, etc.

In state 312, the retrieved page is cached after the client-independent transformations are accomplished. When a page or component of a page is cached, it may be cached in a form or with other information that limits or assists future processing. For example, string conversions may be performed before caching, expiration information may be saved, top and bottom script include strings may be computed, indications may be stored regarding whether any client-specific modifications are or may be required, etc.

In state 314, client-dependent transformations and/or business or browsing rules may be applied. For example, content that should or should not be viewed by a particular attendee may be inserted or removed before the page is sent to the attendee's client browser. Individual attendees or clients may be identified via cookies, through assigned client identifiers or roles, or in some other manner.

In state 316, the requested page is distributed to the attendees, where any necessary client-side transformations are performed and the page is displayed through the attendee's browser.

Thus, one or more hyperlinks within the page may be modified (e.g., by javascripts and/or the collaboration applet) to point to the collaboration server instead of their original targets. Script event handlers may be added to the browser's document object model. For example, event handlers may be added for fields of a form, so that each value input to the form is communicated back to the collaboration server. Other script or page code may be added to facilitate the communication of scrolling, highlighting and pointing events from one attendee (e.g., the host) to the collaboration server and the other attendees.

Script code or files added to a page may be browser- or client-dependent. And, script variables described above (e.g., page ID, original page URL) may be added to a page at the client.

In state 318, an attendee (e.g., the host) selects a hyperlink within the page or some other event is triggered (e.g., an on MouseOver event, an annotation). The attendee's collaboration applet traps the event if the event or reference was not already modified to refer to the collaboration server. The applet then converts the trapped event or reference and forwards it to the collaboration server.

In state 320, the client event is handled at the collaboration server and a co-browsing state change may be distributed to the other attendees. Thus, if the event was an annotation, the other attendees' displays will be annotated similarly. If the event was a request or a link to another page or browsable object, the page or object is retrieved and distributed as described above. The illustrated method of the invention then ends.

Annotating a Co-Browsed Page

In an embodiment of the invention, participants in a real-time on-line co-browsing session experience substantially the same annotation events performed by a host or other participant. In particular, when the host annotates the co-browsed document, that event is communicated to the collaboration server and distributed to other attendees. By communicating the event, and enough information to allow the other attendees to recreate the event, the amount of communication that must be performed is minimized.

In one implementation of this embodiment, annotation events that are distributed among attendees may include: highlighting a region of interest within a co-browsed document, anchoring a presentation pointer at a point of interest within the document, tracking movement of the host's mouse, and scrolling the document. In other implementations any or all of these events, and others, may be distributed.

In a present embodiment of the invention, although a host's scrolling events may be distributed among the attendees, an attendee may also be able to scroll independently of the host. Therefore, an attendee may be able to move around within the document as desired, and may not be limited to the host's scrolling movements.

Different attendees' browsers may be configured in different ways, with different font types and/or sizes, different browser window sizes, different resolutions, etc. Some of the differences in browser configurations may have a substantive effect upon how the co-browsed document is viewed.

For example, the host may have a relatively large window open to browse the document, and use a relatively small font. Thus, the document may completely fit within the host's window. Another attendee may have a smaller window open for browsing the document and/or may use a relatively large font. The document may require scrolling through multiple windows on the attendee's browser (horizontally and/or vertically) to be fully viewed.

In one embodiment of the invention, the sharing or distribution of a host's annotations is facilitated by the addition of one or more DIV elements to a browsable page or browsable content before it is pushed to collaborating attendees. As one skilled in the art will recognize, a DIV element is similar to a "layer" of content.

For each type of annotation that requires the addition of an object or marking to a page, the associated DIV element will include a corresponding image. For example, for highlighting, a transparent or semi-transparent rectangular area of a desired color (e.g., yellow) for highlighting an area of interest is inserted into the DIV element associated with highlighting. For a presentation pointer or mouse tracking, associated DIV elements also receive corresponding images (e.g., an arrow, a trail of arrows or other symbols).

Illustratively, DIV elements are added at the end of the co-browsed content and may be initialized to an invisible state and positioned at the top left hand corner of the document to prevent them from adding any length or width to the document.

In this embodiment, the position and size of a highlighting area, and the position of a presentation pointer or mouse pointer within the host's view of the document, is normalized relative to the document and/or the window in which it is viewed. For example, the location of an annotation by the host may be examined (e.g., by the host's collaboration applet) and normalized relative to the document. Thus, instead of recording the fact that, within the host's browser window, the annotation is located 3 inches in from the left-hand edge of the document and 6.75 inches down from the top edge of the document, the applet may record the fact that the annotation is located one-half (0.5) of the distance from the left edge and three-quarters (0.75) of the distance from the top.

The normalized position of the annotation (and size, for highlighting) is reported to the collaboration server by the host's collaboration applet. The collaboration server then reports the normalized values to other attendees and the annotation is recreated at their browsers. Illustratively, JavaScript and DHTML (Dynamic Hypertext Markup Language) may be used to facilitate communication and application of annotation events.

Similar to the manner in which highlighting events, presentation pointer events and mouse events are reported, scrolling events may be reported according to the normalized horizontal and vertical scroll bar positions.

Figure 4:
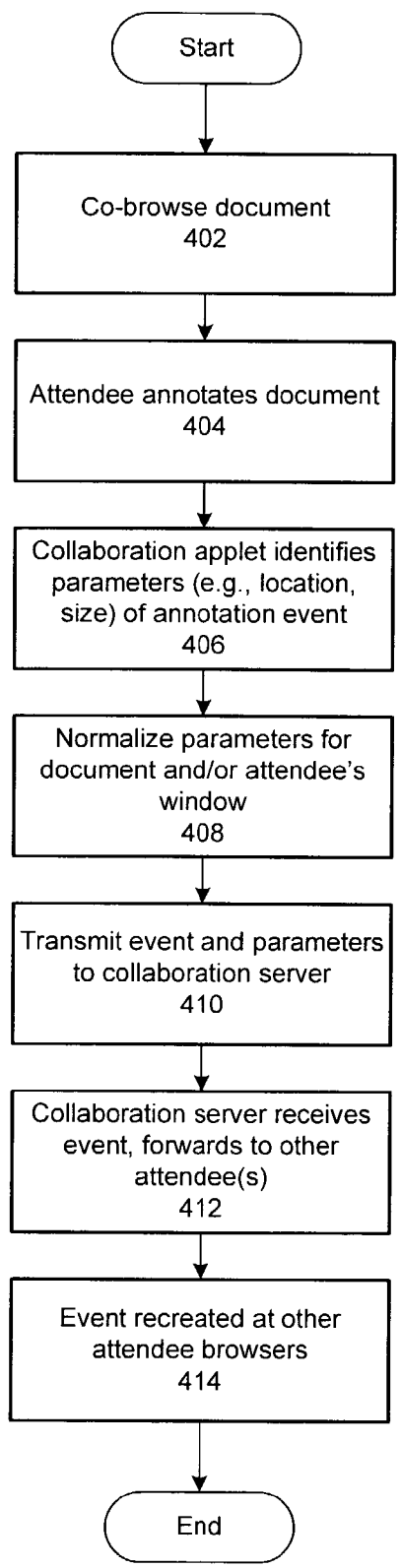
FIG. 4 is a flowchart demonstrating one method of facilitating the annotation of a co-browsed document, according to one embodiment of the invention.

FIG. 4 demonstrates a method of annotating a co-browsed document, according to one embodiment of the invention. In this embodiment, an annotation (e.g., highlighting, moving or placing a pointer, scrolling) by one attendee (e.g., the host) generates an event that is sent to the collaboration server from the attendee's collaboration applet and then distributed to attendees of the collaboration session where the event is recreated.

In state 402, a host attendee and one or more attendees co-browse a document (e.g., a web page). As described in a previous section, a collaboration server may retrieve, modify and serve documents for co-browsing. Each attendee's browser is augmented with a collaboration applet for communicating with the collaboration server, trapping or intercepting browser events (including annotations) and forwarding the events to the collaboration server.

In state 404 the host annotates the document. The annotation may comprise scrolling the document or highlighting a portion of the document, placing a pointer, moving a pointer, etc.

In state 406 the host's collaboration applet identifies the position (e.g., horizontal and/or vertical coordinates) of the event within the host's browser window and, if necessary, the size. For example, the new position of scroll bars or a pointer may be identified. Or, the position and size of an area of highlighting may be identified. The position of the event (and size, if appropriate) may be identified in terms of inches, centimeters, pixels or some other units.

In state 408, the position (and size) of the event is normalized for the document. In particular, a position and size may be translated from an absolute position within the host's window to a relative position and size within the document.

In state 410 the event, and parameters comprising the position (and size) of the event, are transmitted by the host's collaboration applet to the collaboration server.

In state 412, the collaboration server receives the event and may record it as a state change. The server then forwards the event and position (and size) parameters to other attendees' collaboration applets.

In state 414, the other attendees' browsers recreate the annotation event of the host. The method then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of facilitating collaborative browsing of an electronic page, comprising:
   establishing a collaborative browsing session at a collaboration server;
   receiving the electronic page at the collaboration server, wherein the electronic page is formatted according to a markup language and comprises a plurality of URLs (Uniform Resource Locators) identifying objects other than the electronic page;
   on the collaboration server, modifying a first set of the URLs to refer to the collaboration server, wherein the first set of the URLs includes URLs associated with links that cannot be trapped, or modified by a browser at runtime;
   distributing the electronic page from the collaborative server to multiple clients, wherein each client operates a browser; and
   at each client, modifying a second set of the URLs to point to the collaboration server upon selecting or invoking the second set of the URLs.

2. The method of claim 1, further comprising:
   receiving at a first browser an invocation of a first URL in the electronic page that refers to a third party server; and
   redirecting said invocation to the collaboration server.

3. The method of claim 1, wherein said modifying at the collaboration server comprises:
   modifying one or more events within the electronic page that are configured to occur automatically.

4. The method of claim 1, wherein said modifying at the collaboration server comprises:
   modifying a sequence of computer-executable instructions included in the electronic page to prevent execution of the instructions.

5. The method of claim 1, wherein said modifying at each client comprises:
   modifying one or more events within the electronic page that are configured to occur automatically.

6. The method of claim 1, wherein said modifying at each client comprises:
   modifying a sequence of computer-executable instructions included in the electronic page to prevent execution of the instructions.

7. The method of claim 1, further comprising:
at the collaboration server, applying a set of content rules to prevent a portion of the electronic page from being displayed on one or more of the multiple client browsers.

8. The method of claim 1, further comprising:
at the collaboration server, applying a set of content rules to prevent a set of data entered into the electronic page at one of the multiple client browsers from being displayed on at least one other of the multiple client browsers.

9. The method of claim 1, wherein the first set of URLs comprise one or more URLs that would normally be automatically invoked when the electronic page is loaded on the client browser.

10. The method of claim 1, wherein the second set of URLs comprise one or more hyperlinks that are normally followed only when manually selected.

11. The method of claim 1, wherein said modifying a second set of the URLs comprises trapping a URL selected in a client browser.

12. The method of claim 1, wherein said modifying a second set of the URLs comprises trapping an event.

13. The method of claim 1, wherein said modifying a second set of the URLs comprises:
replacing a script code statement with a replacement statement; and
redirecting a URL associated with the script function if said replacement statement is invoked.

14. The method of claim 1, wherein said modifying a first set of the URLs comprises:
modifying one or more SRC attributes within HTML tags within the electronic page to refer to the collaboration server.

15. The method of claim 14, wherein the HTML tags are FRAME tags.

16. The method of claim 14, wherein the HTML tags are SCRIPT tags.

17. The method of claim 14, wherein the HTML tags are IMG tags.

18. The method of claim 1, wherein said modifying a first set of the URLs comprises:
modifying one or more refresh URL attributes within META tags within the electronic page.

19. The method of claim 1, wherein said modifying a first set of the URLs comprises:
modifying one or more SRC attributes within script code tags within the electronic page to refer to the collaboration server.

20. The method of claim 1, wherein said modifying a first set of the URLs comprises:
modifying one or more script code statements within the electronic page to prevent redirection of a client browser from the electronic page to a third party computer identified in the script code statements.

21. The method of claim 1, wherein said modifying a first set of the URLs comprises:
replacing a script code statement with a replacement statement; and
redirecting a URL associated with the script function if said replacement statement is invoked.

22. A computer readable storage medium storing instructions that, when executed by a computer, cause the computer to perform a method of facilitating collaborative browsing of an electronic page, the method comprising:
establishing a collaborative browsing session at a collaboration server;
receiving the electronic page at the collaboration server, wherein the electronic page is formatted according to a markup Language and comprises a plurality of URLs (Uniform Resource Locators) identifying objects other than the electronic page;
on the collaboration server, modifying a first set of the URLs to refer to the collaboration server, wherein the first set of the URLs includes URLs associated with links that cannot be trapped, or modified by a browser at runtime;
distributing the electronic page from the collaborative server to multiple clients, wherein each client operates a browsers; and
at each client, modifying a second set of the URLs to point to the collaboration server upon selecting or invoking the second set of URLs.

23. A computer-implemented method of facilitating co-browsing of a page, comprising:
establishing a collaborative session for co-browsing between two or more attendees, wherein each attendee operates a browser;
downloading to one or more of the attendee browsers a collaboration applet configured to facilitate communication between the browser and a collaboration server;
directing, to the collaboration server, a request for a first page from a first attendee for a first page at server other than the collaboration server;
at the collaboration server:
receiving the first page;
modifying one or more references, within the first page, to content located elsewhere other than on the collaboration server, to refer to the collaboration server, wherein the references includes references associated with links that cannot be trapped, or modified by a browser at runtime;
distributing the first page to the attendees; and
at a client, modifying a set of URLs to point to the collaboration server upon selecting or invoking the set of URLs.

24. The method of claim 23, further comprising:
at a first attendee browser, redirecting to the collaboration server a link selected by a first attendee.

25. The method of claim 23, further comprising:
at the collaboration server, limiting receipt of a portion of content of the first page to a subset of the attendees.

26. The method of claim 23, wherein the content comprises a second page.

27. The method of claim 23, wherein the content comprises an object to be displayed as part of the page.

28. The method of claim 23, wherein the content comprises a series of browser-executable instructions.

29. The method of claim 23, wherein the one or more references comprise a URL.

30. The method of claim 23, wherein the one or more references comprise a file name.

31. The method of claim 23, wherein the one or more references comprise a script code statement.

32. A computer readable storage medium storing instructions that, when executed by a computer, cause the computer to perform a method of facilitating co-browsing of a page, the method comprising:
establishing a collaborative session for co-browsing between two or more attendees, wherein each attendee operates a browser;
downloading to one or more of the attendee browsers a collaboration applet configured to facilitate communication between the browser and a collaboration server;

directing, to the collaboration server, a request for a first page from a first attendee for a first page at server other than the collaboration server;

at the collaboration server:

receiving the first page;

modifying one or more references, within the first page, to content located elsewhere other than on the collaboration server, to refer to the collaboration server, wherein the references includes references associated with links that cannot be trapped, or modified by a browser at runtime;

distributing the first page to the attendees; and at a client, modifying a set of URLs to point to the collaboration server upon selecting or invoking the set of URLs.

33. A collaboration server for facilitating co-browsing of a page, comprising:

a session manager configured to manage a co-browsing session for multiple attendees, wherein each attendee operates a browser, wherein the browser is configured to modify a set of URLs to point to the collaboration server upon selecting or invoking the set of URLS, and wherein the collaboration server modifies a second set of URLs that includes URLs associated with links that cannot be trapped, or modified by the browser at runtime;

a communication manager configured to:

communicate with the attendees via collaboration applets downloaded to the attendee browsers; and signal attendee events to the session manager;

an agent configured to retrieve a third-party web page on behalf of a request from a first attendee, wherein the request is redirected to the collaboration server by the collaboration applet downloaded to the first attendee's browser; and a content manager configured to transform the web page to redirect one or more references to external servers to the collaboration server, wherein the one or more references are configured to be automatically applied by an attendee browser when the web page is loaded by the attendee browser.

34. The collaboration server of claim 33, wherein the content manager comprises a rules engine configured to prevent specified content of a page from being distributed to one or more of the attendees.

35. The collaboration server of claim 33, wherein the content manager comprises a cache configured to cache the web page prior to said transformation.

36. The collaboration server of claim 33, further comprising a database configured to store profiles of the attendees.

37. The collaboration server of claim 33, wherein the database is further configured to store status information regarding the co-browsing session.

* * * * *

UNITED STATES PATENT AND TRADEMARK OFFICE
CERTIFICATE OF CORRECTION

| | | |
|---|---|---|
| PATENT NO. | : 7,149,776 B1 | Page 1 of 1 |
| APPLICATION NO. | : 10/228247 | |
| DATED | : December 12, 2006 | |
| INVENTOR(S) | : Anindo Roy et al. | |

It is certified that error appears in the above-identified patent and that said Letters Patent is hereby corrected as shown below:

On The Title Page
  In section 57 Abstract (line 8), please delete the word, "fro" and replace with the word --for--.

Signed and Sealed this

Twenty-seventh Day of February, 2007

JON W. DUDAS
*Director of the United States Patent and Trademark Office*